(12) United States Patent
Hikmet et al.

(10) Patent No.: US 12,544,974 B2
(45) Date of Patent: Feb. 10, 2026

(54) OPTICAL COMPONENT FOR GENERATING LIGHT EFFECT

(71) Applicant: SIGNIFY HOLDING B.V., Eindhoven (NL)

(72) Inventors: Rifat Ata Mustafa Hikmet, Eindhoven (NL); Paulus Albertus Van Hal, Waalre (NL); Bert Wouters, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 812 days.

(21) Appl. No.: 16/619,135

(22) PCT Filed: Jun. 1, 2018

(86) PCT No.: PCT/EP2018/064401
§ 371 (c)(1),
(2) Date: Dec. 4, 2019

(87) PCT Pub. No.: WO2018/224395
PCT Pub. Date: Dec. 13, 2018

(65) Prior Publication Data
US 2020/0114572 A1    Apr. 16, 2020

(30) Foreign Application Priority Data
Jun. 9, 2017 (EP) ................................. 17175213

(51) Int. Cl.
*B29C 64/118* (2017.01)
*B29C 64/209* (2017.01)
*B29D 11/00* (2006.01)
*B33Y 70/00* (2020.01)
*B33Y 80/00* (2015.01)

(52) U.S. Cl.
CPC .......... *B29C 64/118* (2017.08); *B29C 64/209* (2017.08); *B29D 11/00798* (2013.01); *B33Y 70/00* (2014.12); *B33Y 80/00* (2014.12)

(58) Field of Classification Search
CPC .............................. B29C 64/118; B33Y 80/00
See application file for complete search history.

(56) References Cited

U.S. PATENT DOCUMENTS

2012/0231225 A1* 9/2012 Mikulak ................. B29C 48/05
                                                          264/255
2015/0021628 A1   1/2015 Medendorp et al.
2015/0086671 A1   3/2015 Uto et al.
2015/0174824 A1   6/2015 Gifford et al.
(Continued)

FOREIGN PATENT DOCUMENTS

CN    105946232 A    9/2016
EP      3103633 A1  12/2016
(Continued)

*Primary Examiner* — Nathan T Leong

(57) ABSTRACT

An optical component (10) is disclosed comprising a plurality of layers (11), each layer comprising a core portion (13) and a shell portion (15) enveloping the core portion, wherein the core portion is made of a first material and the shell portion is made of a second material, the first material and the second material having a different transmissivity. Also disclosed are a luminaire comprising such an optical component and a method of manufacturing such an optical component.

11 Claims, 11 Drawing Sheets

(56) References Cited

U.S. PATENT DOCUMENTS

| | | |
|---|---|---|
| 2015/0367576 A1 | 12/2015 | Page |
| 2016/0200047 A1 | 7/2016 | Mark et al. |
| 2017/0081538 A1 | 3/2017 | Wu |

FOREIGN PATENT DOCUMENTS

| | | |
|---|---|---|
| FR | 1053799 A | 2/1954 |
| JP | 2016221956 A | 12/2016 |
| JP | 2019502568 A | 1/2019 |
| WO | 2009113422 A1 | 9/2009 |
| WO | 2015077262 A1 | 5/2015 |
| WO | 2017080842 A1 | 5/2017 |

\* cited by examiner

OPTICAL COMPONENT FOR GENERATING LIGHT EFFECT

CROSS-REFERENCE TO PRIOR APPLICATIONS

This application is the U.S. National Phase application under 35 U.S.C. § 371 of International Application No. PCT/EP2018/064401, filed on Jun. 1, 2018, which claims the benefit of European patent application Ser. No. 17/175,213.2, filed on Jun. 9, 2017. These applications are hereby incorporated by reference herein.

FIELD OF THE INVENTION

The present invention relates to a method of manufacturing a multi-layered optical component. The present invention further relates to an optical component obtainable by such a method, and to a luminaire including such an optical component.

BACKGROUND OF THE INVENTION

There is an increasing demand for light sources, e.g. luminaires and lamp shades, which can produce an interesting visual effect. An example of such a device is disclosed in US 2015/0021628 A1, which discloses a solid state light emitting device including one or more light affecting elements (e.g., of one or more light-transmissive, light-absorptive, light-reflective, and/or lumiphoric materials) formed on, over, or around at least one solid state light emitter, with the light affecting elements including multiple fused elements embodying plurality of dots, rods, or layers such as may be formed by three-dimensional (3-D) printing. Light affecting elements may be individually tailored to individual solid state light emitters, such as to yield different optical distributions for interactions between each specific emitter and its corresponding light affecting element.

Another example of an optical element formed by 3-D printing is disclosed in WO 2015/077262 A1, which discloses an optical fiber or waveguide comprising alternating layers of high and low refractive index materials around a core, in which the optical fiber or waveguide may be formed by coextrusion, microlayer extrusion or multicomponent/fractal coextrusion.

US-2012/231225 discloses a consumable filament for use in an extrusion-based additive manufacturing system. The consumable filament comprises a core portion of a first thermoplastic material, and a shell portion of a second thermoplastic material that is compositionally different from the first thermoplastic material. The consumable filament is configured to be melted and extruded to form roads of a plurality of solidified layers of a three-dimensional object. The roads at least partially retain cross-sectional profiles corresponding to the core portion and the shell portion of the consumable filament. An attractive property of such devices is that they at least partially can be formed using 3-D printing, such that the 3-D printed parts can be manufactured in a fast and cost-effective manner. However, these devices are typically designed to perform a particular optical function rather than an aesthetically pleasing effect, e.g. by manipulating different portions of a luminous output of a solid state lighting element in a different manner. Hence, there remains a need for different optical components that can be manufactured in a cost-effective manner using 3-D printing techniques.

SUMMARY OF THE INVENTION

The present invention seeks to provide an optical component that can be manufactured in a cost-effective manner using 3-D printing techniques and is capable of generating an aesthetically pleasing visual effect.

The present invention further seeks to provide a luminaire including such an optical component.

The present invention further seeks to provide a method of manufacturing such an optical component.

According to a first aspect, there is provided a method of manufacturing an optical component by means of fused deposition modeling using a 3-D printing apparatus. The 3-D printing apparatus comprises an extruder nozzle. The 3-D printing apparatus further comprises a filament feeder for feeding a preformed core-shell filament having a core of a first material and a shell of a second material through the extruder nozzle, or a plurality of filament feeders including a first filament feeder for feeding a first filament comprising the first material through the extruder nozzle and a second filament feeder for feeding a second filament comprising the second material through the extruder nozzle. The method comprises the step of 3-D printing a stack of layers with the 3-D printing apparatus by feeding the preformed core-shell filament or the first filament and the second filament through the extruder nozzle such that molten second material surrounds the molten first material to form the optical component, wherein at least some of the layers of the optical component comprise a core portion made of the first material and a shell portion enveloping the core portion made of the second material, the second material being optically transparent and the first material having a different light transmissivity to the second material.

According to a second aspect, there is provided an optical component obtainable by the method according to the first aspect, wherein the optical component comprises a plurality of layers, each layer comprising a core portion and a shell portion enveloping the core portion, wherein the core portion is made of a first material and the shell portion is made of a second material, the second material is optically transparent and the first material has a different transmissivity than the second material.

The term 'optically transparent' when used for the shell portion refers to the shell portion exhibiting light transmission that is preferably more than 5%, more preferably more than 30%, and most preferably more than 50% transmissive compared to light falling onto the first material portions without being affected by the second material shell. A substantially optically transparent material has an optical transmission of more than 90% excluding surface reflections.

Fused deposition modeling (FDM) is a 3D printing technique wherein a thermoplastic filament is heated to its melting point and then extruded, layer by layer, to create a three dimensional object. FDM printers are relatively fast, low cost and can be used for printing complicated 3D objects. Such printers may be used for printing various shapes using various polymers.

The method according to the first aspect results in the formation of an optical component that provides angularly-dependent light effects caused by light rays along different trajectories interacting differently with the optical component, e.g. a first light ray as observed by an observer may pass through the optical component through the shell portion of a layer whereas a second light ray may interact with the core portion of a layer such that these light rays are perceived differently or selectively by the observer, thereby creating a light effect to the observer.

Objects manufactured by means of fused deposition modeling have a characteristic surface texture typically referred to as a ribbed or rippled surface structure. This characteristic surface texture is also present in the optical component that is manufactured by means of the method according to the first aspect, and it provides the optical component with characteristics that are not provided by similar optical components that have a flat surface. For example, US-2015/086671 discloses an optical component in the form of a laminated film that has a structure in which layers of resin A and layers of resin B are alternately laminated in the width direction, wherein, when viewed in a cross-section parallel to the film width direction and the thickness direction, the layers of resin B are covered with resin A. The resin A and B are different resins or have different types and amounts of additives, such that diffusion of light transmitting through the layers made of resin A is larger than diffusion of light transmitting through the layers made of resin B. The optical component of US-2015/086671 can be used for privacy window applications, allowing a user to only look through the optical component up to a certain angle of observation. Above a certain angle, the field is blocked and light gets absorbed. In the optical component according to the present invention, the characteristic surface texture described above is arranged to change the direction of a light beam and to provide lensing. Up to certain angles, light that is incident on the surface of the optical component can get focused by the shell portion onto the core portion of the core-shell structure. In case the core portion is light absorbing, the light thus focused may be absorbed. Light incident at larger angles may pass through the optical component without interacting with the core portion. For the optical component of the present invention, this particular interaction with incident light is markedly different from the interaction in case the optical component has a flat surface, due to a surface texture that is characteristic for objects manufactured by means of fused deposition modelling. This behavior enables the optical component of the present invention to be used as glare reducing optical component in a lighting device.

In addition to the above, the observer may perceive such light effects as dynamic light effects when changing his or her position, i.e. viewing angle, relative to the optical component in at least some embodiments of the present invention. Consequently, such an optical component may be perceived as particularly interesting and aesthetically pleasing. Moreover, such core-shell layers can be readily formed using co-extrusion 3-D printing techniques, such that the optical component can be manufactured in a straightforward and cost-effective manner. The core shell-type structures described in the present application may be produced during printing, e.g. through co-extrusion, or may be be supplied to the printer, e.g. a 3-D printer as a preformed core-shell filament.

The optical effects created by the core portion, e.g. in case of a transparent shell portion, may be tuned by controlling the shape of the core portion. For example, the shell portion may have a cross-sectional shape different to the core portion to obtain different optical effects.

Alternatively, the core portion and the shell portion each have polygonal cross-sections, wherein the polygonal cross-section of the core portion is rotated relative to the polygonal cross-section of the shell portion in at least a part of each layer to obtain a particular optical effect.

In some embodiments, the optical effect may be different for different parts of the optical component to add another dimension of dynamic light effects as perceived by the observer to the optical component. This for example may be achieved by the orientation of the core portion relative to shell portion changing throughout each layer, for example by rotation of a polygonal core portion relative to the shell portion throughout the layer or by spiralling of such a core portion within the shell portion throughout the layer.

Similarly, the (co-extruded) core-shell layers do not need to be concentric in case of the core and shell portions having circular cross-sections; for example, the centre of a core portion may be displaced relative to the centre of a shell portion in order to obtain a particular optical effect.

Another dynamic light effect may be created for the optical component in an embodiment in which the core portion has first dimensions in a first layer of the plurality of layers and has second dimensions different to the first dimensions in a second layer of the plurality of layers. This alters the light effect created with the second layer compared to that created with the first layer, such that an observer when looking at different layers of the optical component will observe different light effects, e.g. the same type of light effect to different degrees or intensities.

The optical component may further comprise at least one layer comprising only the first material or the second material in order to further change the appearance of the optical component.

In example embodiments, the second material is a substantially transparent material and the first material is one of a diffusively reflective material, absorbent material and a coloured material. In such embodiments, light passes through the second material unaltered whilst light interacting with the first material is modified, e.g. diffusively reflected, absorbed or coloured such that the different interactions of light with the first and second materials respectively will be clearly noticeable by an observer of the optical component.

However, embodiments of the present invention are not necessarily limited to optical components creating particular light effects. In an alternative embodiment, the surface appearance of the optical component may be controlled by selection of the second material. For example, the second material may be a translucent material that gives the optical component a satin or matt appearance, or may be a transmissive material that gives the optical component a shiny or glossy appearance. Alternatively or additionally, the second material may be a coloured material to give the optical component a coloured appearance.

The optical component may have any suitable shape, such as a planar or curved body for instance, behind which a light source may be placed to create a particular optical effect as explained above. In another embodiment, the optical component comprises an inner volume, and each layer envelopes part of said inner volume. In such an embodiment, the optical component for example may define a lamp shade or the like, wherein a light source may be placed in the inner volume to create the aforementioned light effects for an observer.

The layers of the optical component may be stacked in any suitable manner in order to obtain an optical component having a particularly desired shape. For example, the layers may be staggered, e.g. to obtain a (partially) tapered optical component.

According to another aspect, there is provided a luminaire comprising the optical component of any of the herein described embodiments. Such a luminaire, which may further comprise one or more light sources, provides an aesthetically pleasing effect to an observer, which optical effect is particularly interesting due to the angular dependence of the created optical effect, where such angular dependence is present.

According to yet another aspect, there is provided a method of manufacturing an optical component, the method comprising providing a 3-D printing apparatus comprising an extruder nozzle having a filament feeder for feeding a preformed core-shell filament having a core of a first material and a shell of a second material through the nozzle; or a plurality of filament feeders including a first filament feeder for feeding a first filament comprising the first material through the extruder nozzle and a second filament feeder for feeding a second filament comprising the second material through the extruder nozzle; and 3-D printing a stack of layers with the 3-D printing apparatus by feeding the preformed core-shell filament or the first filament and the second filament through the nozzle such that molten second material surrounds the molten first material to form the optical component, wherein at least some of the layers of the optical component comprise a core portion made of the first material and a shell portion enveloping the core portion made of the second material, the second material being optically transparent and the first material having a different light transmissivity to the second material.

The ability to manufacture the optical component according to embodiments of the present invention using co-extrusion 3-D printing or preformed core-shell filaments ensures that the optical component can be produced in a fast and cost-effective manner, in particular when the 3-D printing comprises fused deposition modelling, which is known to facilitate the manufacture of complex 3-D objects.

In an embodiment, at least the first filament feeder has a polygonal cross-section, and wherein 3-D printing the stack of layers with the 3-D printing apparatus comprises rotating the first filament feeder relative to the second filament feeder during printing of a layer comprising a core portion made of the first material and a shell portion surrounding the core portion made of the second material. In this manner, each core-shell layer can create an optical effect that changes along the core-shell layer, thereby further adding interest to the optical component.

In another embodiment, 3-D printing a stack of layers with the 3-D printing apparatus to form the optical component further comprises at least one of printing different layers in which the core portion has different diameters; and printing at least one layer made of the first material or the second material only. In this manner, the optical component comprises different types of layers in different locations of the optical component, such that an optical component having a more complex design can be realized.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
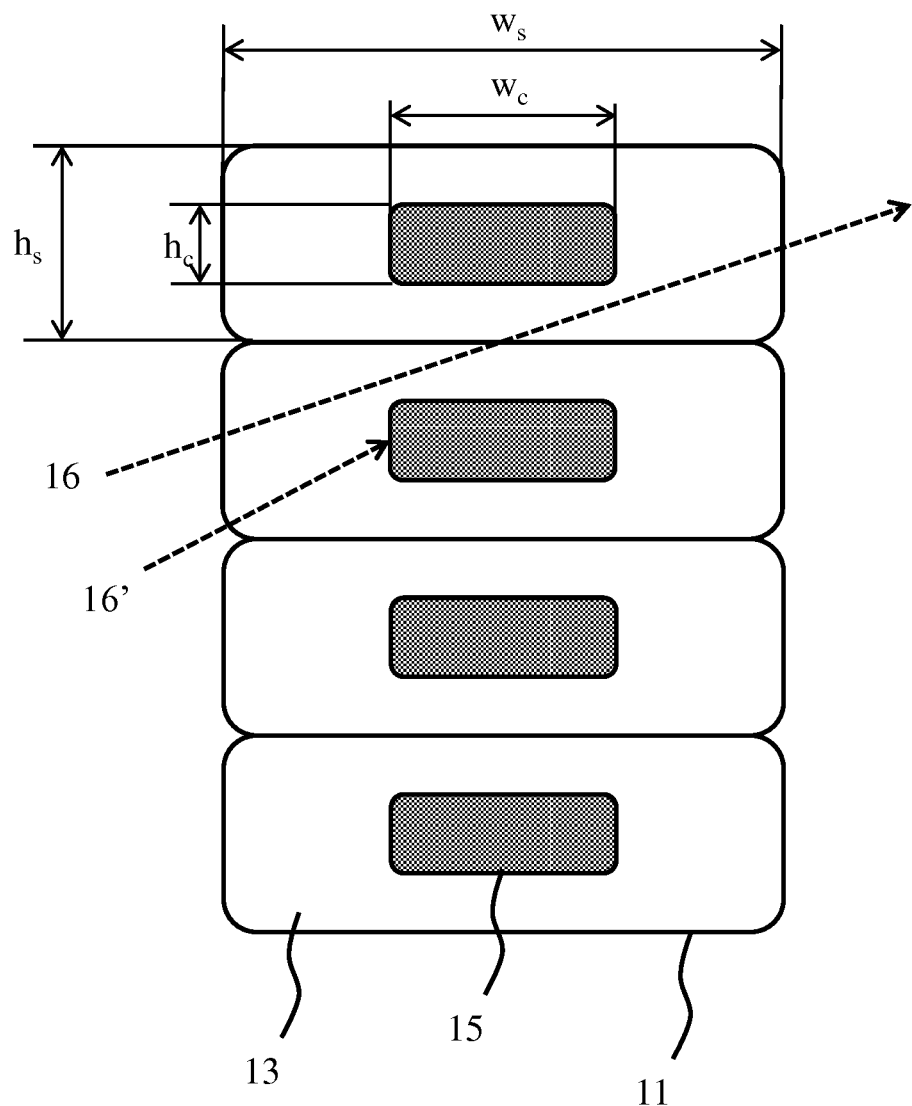
FIG. 1 schematically depicts a cross-sectional view of an optical component according to an example embodiment.

It should be understood that the Figures are merely schematic and are not drawn to scale. It should also be understood that the same reference numerals are used throughout the Figures to indicate the same or similar parts.

FIG. 1 schematically depicts a cross-sectional view of (part of) an optical component 10 according to an embodiment of the present invention. The optical component 10 comprises a plurality of layers 11, each comprising a core-shell structure including a core portion 15 enveloped by a shell portion 13. Such a core-shell structure may be formed by co-extrusion of two filaments using a single nozzle in a 3-D printing process known as fused deposition modeling (FDM) printing as will be explained in more detail below. Such techniques make it possible to form particularly thin layers 11, e.g. having a thickness of less than 2 mm, thereby ensuring that the details of the characteristic surface texture (e.g. a stepped profile) of the layers 11 cannot be observed from a typical observation distance from the optical component 10 when in use, such as a distance of 1 m or more when the optical component 10 is used as a lampshade such as a pendant lamp shade or a lampshade mounted on a pole-based floor-mounted luminaire by way of non-limiting example.

The dimensions of the core portion 15 and the shell portion 13 may be defined in the setup of the printing process of the optical component 10. For example, each core portion 15 may have a width $w_e$ and a height $h_e$, and each shell portion 13 may have a width $w_s$ and a height $h_s$ that may be defined in this manner, e.g. in a printing file that specifies the object to be printed by the 3-D printer. Alternatively, such core-shell layers 11 may be 3-D printed using preformed core-shell filaments, such that co-extrusion of separate filaments is not required.

According to the present invention, the core portion 15 may be made of a first material and the shell portion 13 may be made of a second material different to the first material. This difference is expressed in a difference in transmissivity of light through these different portions. The second material is optically transparent, i.e. typically has a higher transmissivity than the first material although embodiments of the present invention are not necessarily limited thereto. In a first set of embodiments, this difference in transmissivity is leveraged to create a decorative optical effect for an observer of the optical component 10 when light passes through this optical component and is observed by the observer. This is schematically depicted by the example light rays 16 and 16' that interact with the optical component 10. The first light ray 16 passes through the second material defining the shell portions 13 of the respective layers 11, whereas the second light ray 16' is absorbed by the first material defining the respective core portions 15 of these layers 11. Consequently, an observer of the optical component 10 is presented with an angularly dependent optical effect, i.e. an optical effect dependent of the viewing angle under which the observer observes the optical component 11, which will give the observer the impression of a dynamic optical effect, here an effect of alternating light regions and dark regions in the optical component 10, for example when the observer walks past the optical component 10. For the sake of convenience, light rays 16 and 16' are depicted as straight lines without refraction at the interfaces. Also in the remaining figures, the light rays are depicted as straight lines. Obviously, refraction will occur and because of the characteristic surface texture of layers 11 the shell portions 13 will have a lensing effect.

Figure 2:
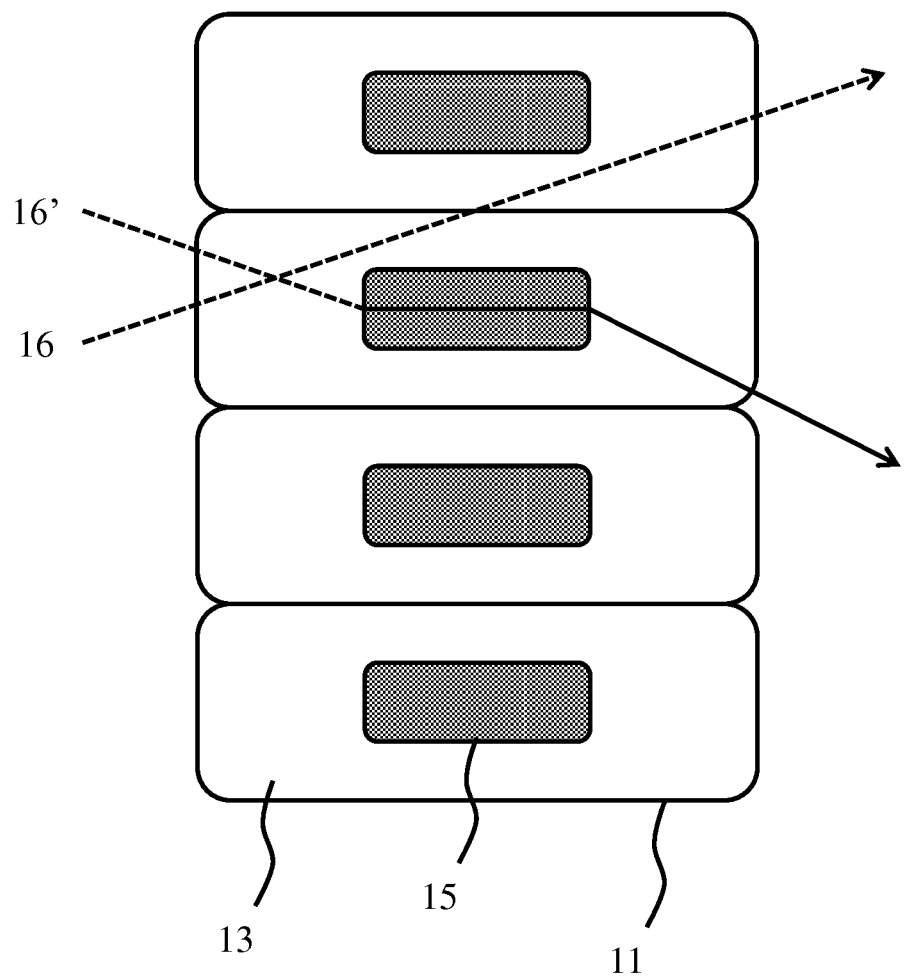
FIG. 2 schematically depicts a cross-sectional view of an optical component according to another example embodiment.

FIG. 2 schematically depicts another example embodiment of such an optical component 10 in which the shell portions 13 of the layers 11 have a different transmissivity than the core portions 15. In this embodiment, a light ray 16 passing through the second material of the shell portions 13 may pass through this material substantially unaltered in terms of its spectral composition, whereas a light ray 16' passing through the first material of a core portion 15 has its spectral composition altered, e.g. by absorption of part of its spectral composition. In other words, in this embodiment the colour of a light ray 16 may not change when passing through the optical component 10, whereas the colour of a light ray 16' may be altered by the first material of a core portion 15. In this context, it should be understood that such a colour change also includes conversion of white light into coloured light, e.g. by absorption of part of the spectrum of the white light when interacting with the first material of the core portion 15. In this embodiment, the observer of the optical component 10 is presented with a dynamic (angularly dependent) light effect in which the colour of the light passing through the optical component 10 appears to change as a function of the angle under which the observer looks at the optical component 10.

Figure 3:
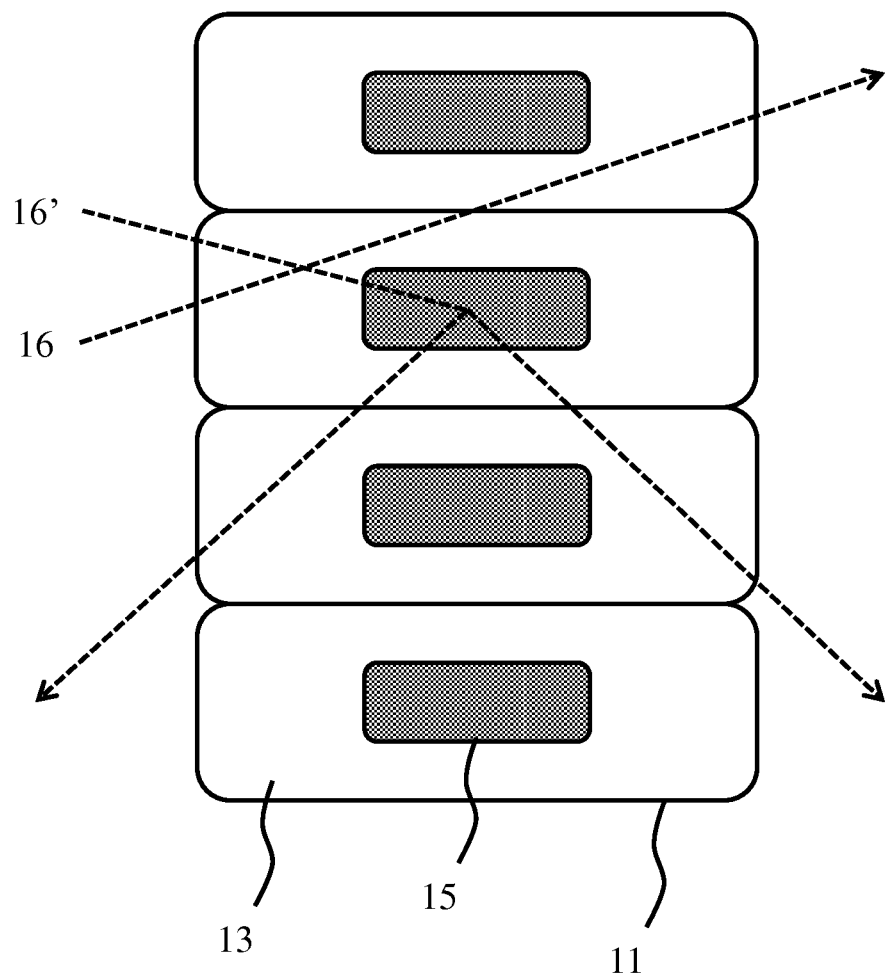
FIG. 3 schematically depicts a cross-sectional view of an optical component according to yet another example embodiment.

FIG. 3 schematically depicts another example embodiment of such an optical component 10 in which the shell portions 13 of the layers 11 have a different transmissivity than the core portions 15. In this embodiment, a light ray 16 passing through the second material of the shell portions 13 may pass through this material substantially unaltered, whereas a light ray 16' passing through the first material of a core portion 15 is diffusively reflected, e.g. scattered, by the core portion 15 as indicated by the multiple directions in which the light ray 16' propagates when interacting with a core portion 15. This for example may be achieved by the inclusion of a diffuse reflective material in the core portions 15. Examples of such diffuse reflective materials include reflective particles, reflective flakes such as metal oxide, e.g. $TiO_2$, or aluminium flakes, and so on. In this embodiment, the observer is presented with a dynamic light effect in which the intensity of the light passing through the optical component 10 appears to change as a function of the angle under which the observer looks at the optical component 10.

More generally speaking, the shell portions 13 may be (substantially) optically transparent, with the respective core portions 15 being less transparent than the transmissive surrounding shell portions 13. For example, the core portions 15 may be partially or totally absorbent or reflective. More specifically, the core portions 15 may be coloured, reflective, diffuse or emissive. Alternatively, the cover portions 15 may be transmissive but have a different refractive index to the transmissive portions 13. It should be understood that not all core portions 15 have to be the same, it is equally feasible that different core portions 15 have different optical properties, for example to create more intricate or complex optical effects with the optical component 10.

In other words, each of the layers 11 may have shell portions 13 and core portions 15 that are optically different with respect to each other, with the transmissive shell portions 13 being more transmissive than the core portions 15. The difference in the optical properties of the shell portions 13 and core portions 15 may be in terms of scattering characteristics (scattering angle), reflection characteristics, refractive index and luminescence as well as in terms of absorption and colour characteristics as explained in more detail above.

In the context of the present application, where reference is made to a transmissive or optically transparent portion 13, such a portion comprises a material that, when having a thickness of 1 mm, transmits more than 5% and preferably transmits more than 20% of the light falling onto it. Such transmissive portions may be substantially optically transparent, i.e. have a light transmittance of over 90% excluding surface reflections, may have a coloured appearance, may be luminescent and/or may be reflective in some embodiments.

Figure 4:
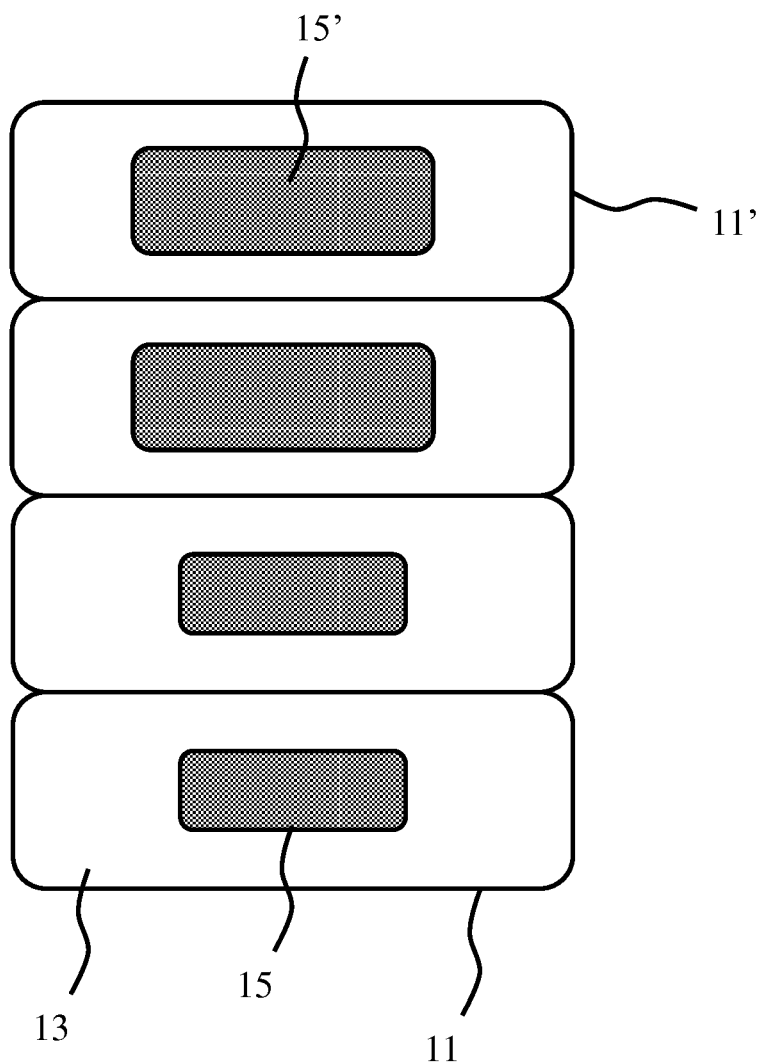
FIG. 4 schematically depicts a cross-sectional view of an optical component according to yet another example embodiment.

In the above embodiments, the optical component 10 is built up of a plurality of identical layers 11 there are stacked on top of each other in order to create the optical component 10. However, it should be understood that embodiments of the present invention are not limited thereto. An example alternative embodiment is shown in FIG. 4, in which the core portions 15 in different layers 11 may have different dimensions. This is schematically depicted by a first set of layers 11 including core portions 15 having first dimensions and a second set of layers 11' including core portions 15' having second dimensions that are different to the first dimensions. As will be readily understood by the skilled person, such an optical component 10 may be produced in a 3-D printing process in a straightforward manner by changing the specified dimensions of the core portions 15 during printing. By varying the dimensions of the core portions 15 between layers 11 of the optical component 10, an optical effect may be created that changes in intensity between such layers 11. This therefore adds another dimension to the optical effect created with the optical component 10, as an observer looking at different regions of the optical component 10 will be presented with an optical effect that is weaker or stronger depending on which region of the optical component 10 the observer is looking at, which may make the optical component 10 even more aesthetically interesting to the observer.

Figure 5:
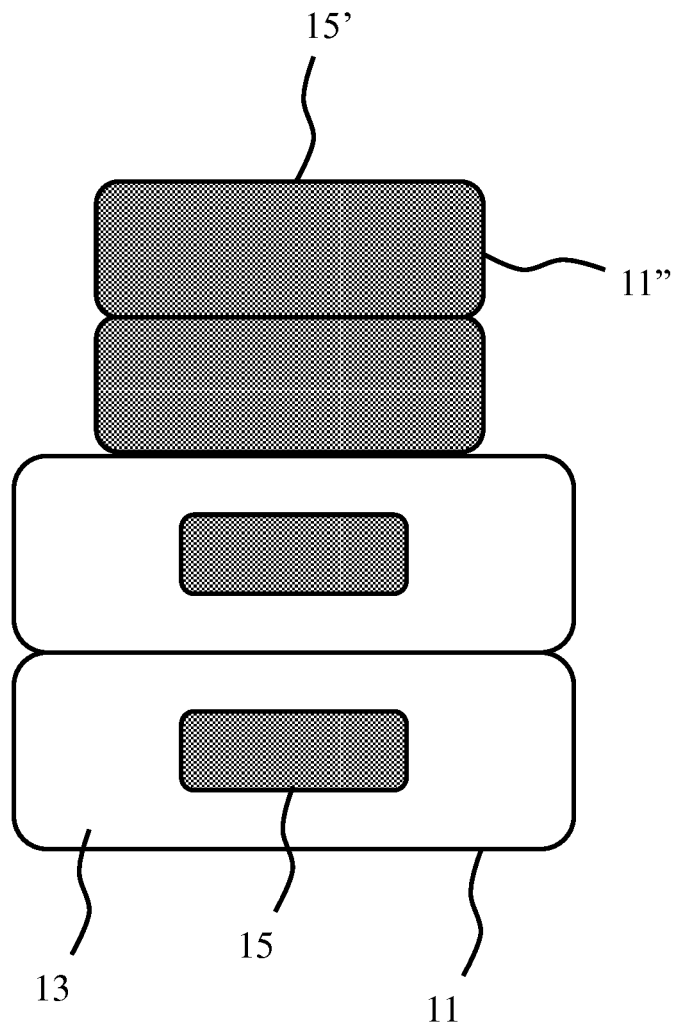
FIG. 5 schematically depicts a cross-sectional view of an optical component according to yet another example embodiment.
Figure 6:
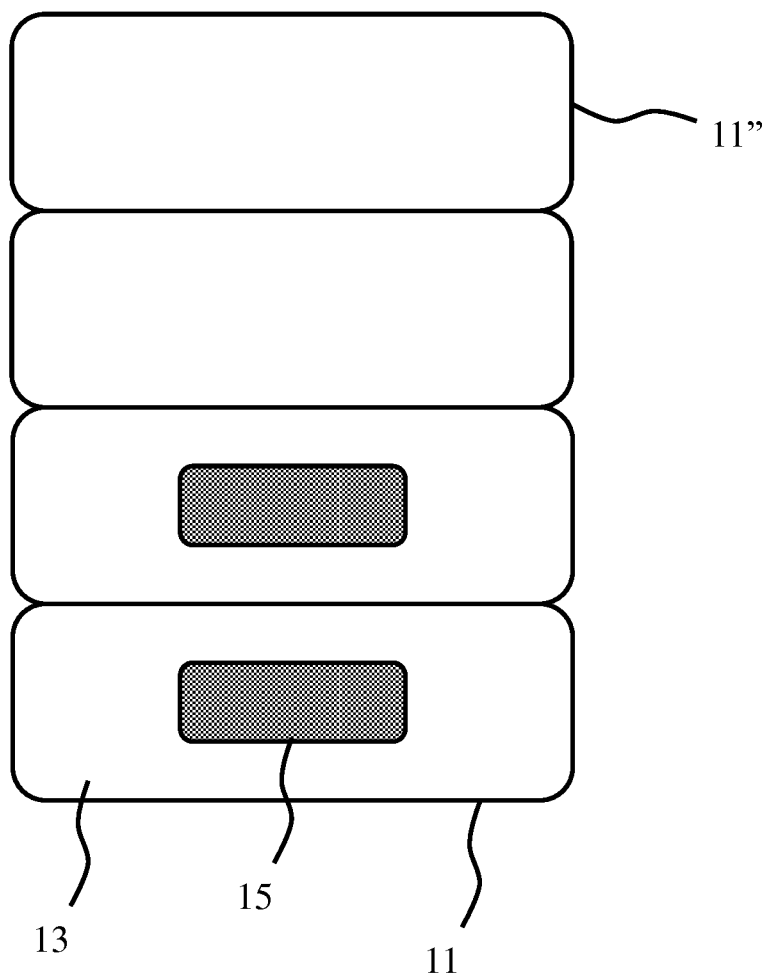
FIG. 6 schematically depicts a cross-sectional view of an optical component according to yet another example embodiment.

In yet another example embodiment, the optical component 10 may further include at least one further layer 11" that only contains a core portion 15' as schematically depicted in FIG. 5 or a shell portion 13 as schematically depicted in FIG. 6. In this manner, the appearance of the optical component 10 may be further tuned, such as for example in the case as schematically depicted in FIG. 5 in which the external surface of the optical component 10 is given a different appearance by the at least one further layer 11" or in which as is schematically depicted in FIG. 6 the angularly dependent optical effect created with the optical component 10 is only created in certain regions of the optical component 10, i.e. is not created in regions formed by one or more further layers 11" in which no core portions 15 are included. This for example may be utilised in application domains in which the optical component 10 is to provide functional lighting in combination with dynamic lighting effects, in which the functional lighting is provided by regions defined by the further layers 11" and the dynamic lighting effect is provided by the regions defined by the layers 11, in particular when an observer of the optical component 10 changes his or her orientation relative to the optical component 10.

Figure 7:
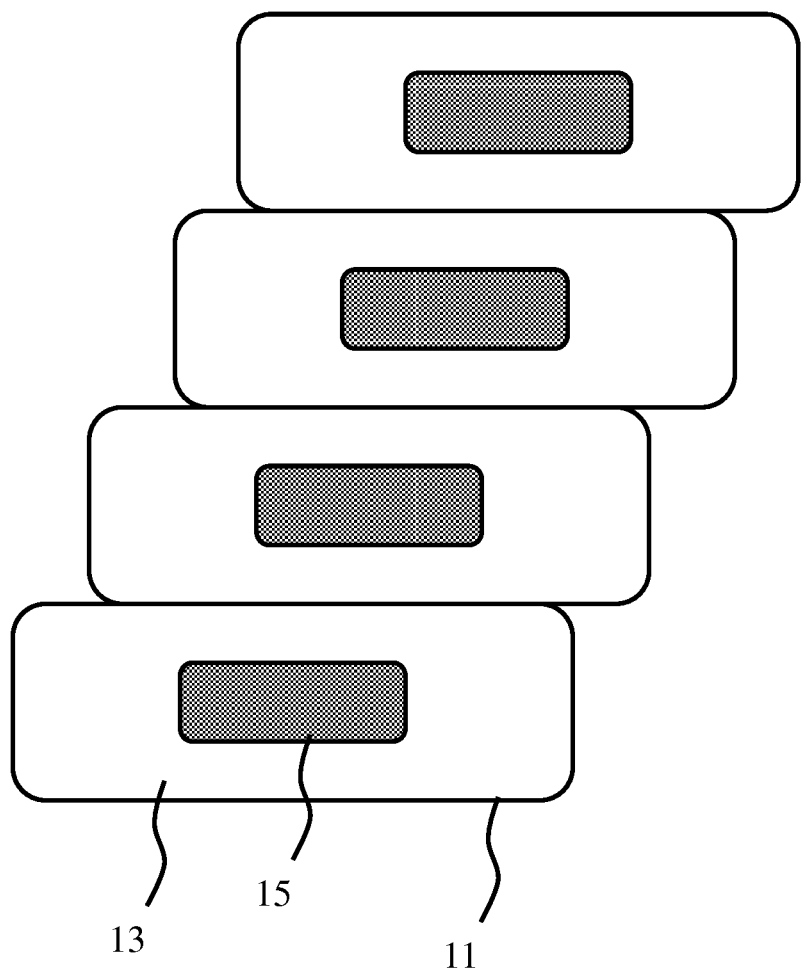
FIG. 7 schematically depicts a cross-sectional view of an optical component according to yet another example embodiment.

In the above embodiments, the layers 11 (and 11', 11" where present) are stacked in alignment with each other in order to build up the optical component 10 although it should be understood that embodiments of the present invention are not limited thereto. For example, FIG. 7 schematically depicts an alternative embodiment in which the layers 11 are stacked in a staggered fashion, which for example may be done in order to create a particular shape of the optical component 10. As will be readily understood by the skilled person, in order to create particular shapes of the optical component 10 in yet further embodiments (not shown) the optical component 10 may be built up by a combination of layers 11 that are stacked in alignment and further layers 11 there are stacked in such a staggered fashion.

The optical component 10 may form an open structure, e.g. a planar or curved structure that is at least partially built up by the layers 11 (and further layers 11' and/or further layers 11" where present). For example, the optical component 10 may be used as a cover or the like over a surface-mounted, e.g. wall-mounted or ceiling-mounted light source arrangement to create the desired optical effect to an observer looking at the optical component 10.

Figure 8:
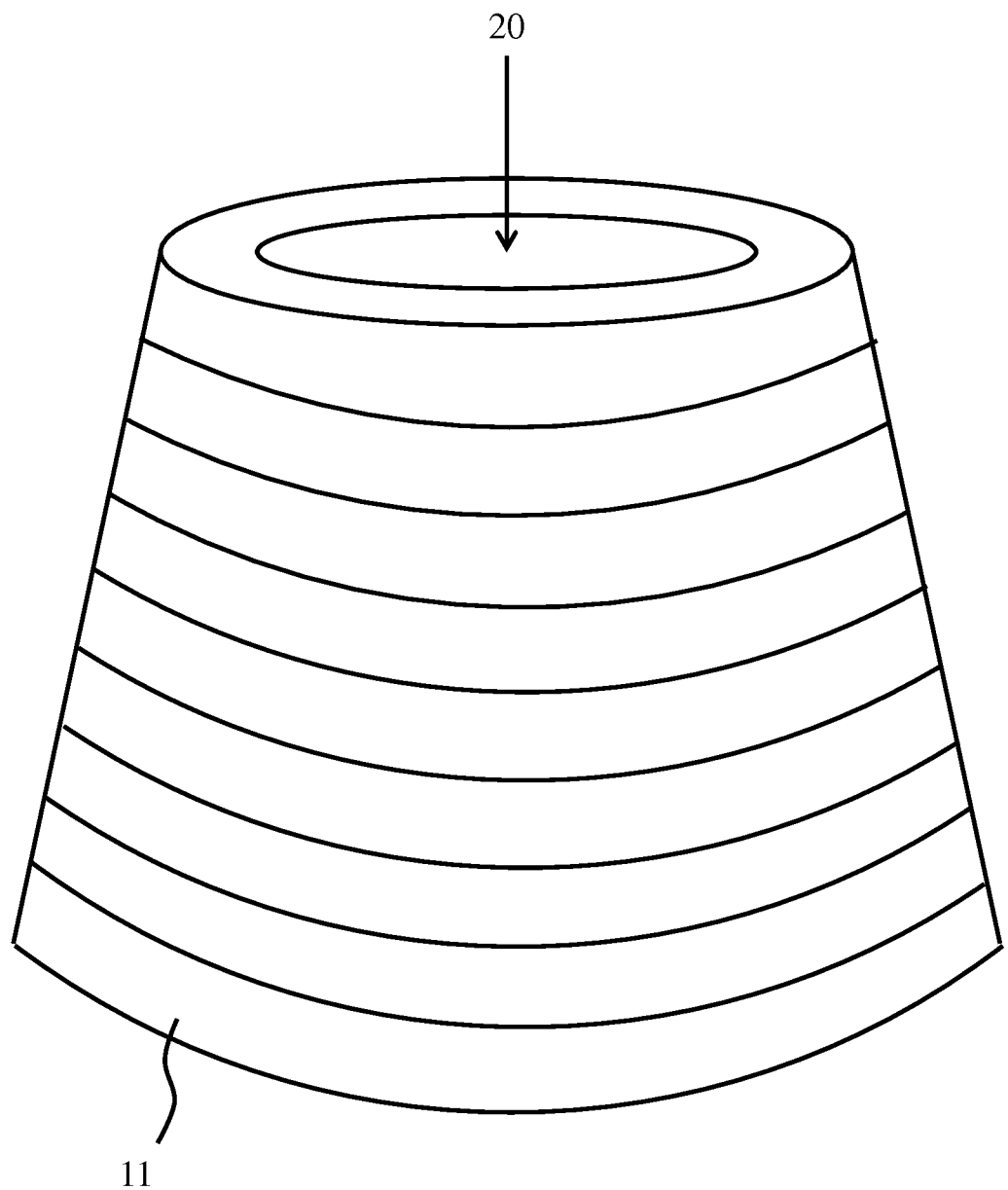
FIG. 8 schematically depicts a perspective view of an optical component according to an example embodiment.

In an alternative embodiment, each of the layers 11 forms a closed structure that surrounds or envelopes a portion of an inner volume 20 of the optical component 10, which inner volume 20 may be used for positioning one or more light sources relative to the optical component 10, e.g. within the inner volume 20 or outside the inner volume, such that the optical effect may be observed by looking into the inner volume 20. An example embodiment of such an optical component 10 delimiting such an inner volume 20 is schematically depicted in FIG. 8. Any suitable type of light source may be used for this purpose, such as an incandescent or fluorescent light source or a solid state light source such as one or more LEDs, which may be white light LEDs, coloured LEDs or combinations thereof. The closed structure formed by each of the layers 11 may have any suitable shape, e.g. a continuous shape such as an annular shape or an ellipsoid shape, or a discontinuous shape such as a polygonal shape, e.g. a triangular shape, rectangular shape, and so on. In an example embodiment, the layers 11 are staggered such that the staggered layers 11 form a truncated conical optical component 10, which for example may be useful if the optical component 10 is to be used as a lampshade such as a pendant lamp shape. However, it should be understood that depending on the intended application of the optical component 10, the layers 11 may have different shapes and not each layer 11 may have the same shape, i.e. different layers 11 may have different shapes, such that the optical component 10 may have any suitable shape. For example, it is equally feasible to create irregular patterns in the optical component 10, for example by different layers 11 having different dimensions such as a different thickness T and/or a different total width, and/or by varying the degree of staggering between the respective layers 11 forming the optical component 10. Similarly, different layers 11 may have differently dimensioned shell portions 13 and/or core portions 15. The dimensions of $w_s$, $h_s$, $w_c$ and $h_c$ may be individually chosen for each layer 11 in order to tune the optical properties of the optical component 10.

Figure 9:
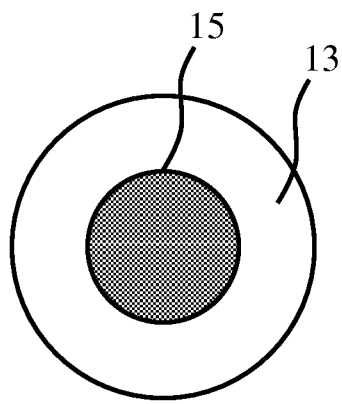
FIG. 9-12 schematically depict cross-sectional views of a layer of an optical component according to example embodiments.
Figure 10:
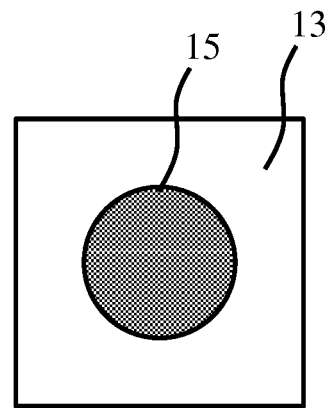

The optical effect created with the respective layers 11 of the optical component 10 as described in the aforementioned embodiments may be further tuned by controlling the shape of the core portion 15 and the enveloping shell portion 13 of such layers. FIG. 9-12 schematically depict cross sections of example embodiments of such layers 11. In FIG. 9, a concentric arrangement is shown in which a core portion 15 having a circular cross-section is centred in a shell portion 13 also having a circular cross-section to form the layer 11. However, layers 11 formed by co-extrusion or using pre-formed core-shell filaments in a 3-D printing process are not necessarily limited to such a shape. For example, a core portion 15 having a circular cross-section may be enveloped by a polygonal shell portion 13 to form a layer 11 as schematically depicted in FIG. 10 to tune the optical effect created by the layer 11. As will be understood, this furthermore may be used to alter the overall appearance of the optical component 10.

Figure 11:
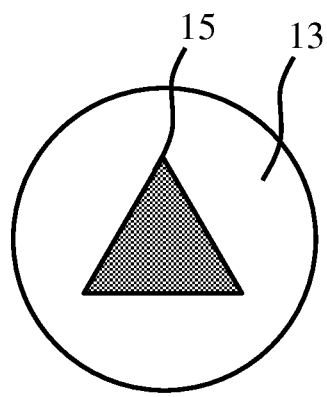
Figure 12:
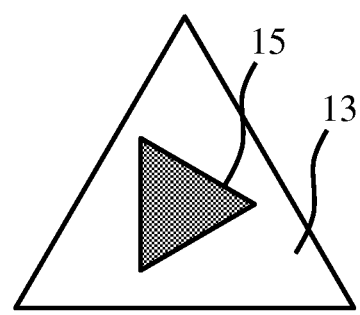

FIG. 11 schematically depicts a cross-section of yet another example embodiment of a layer 11 of the optical component 10 in which a core portion 15 having a polygonal (here triangular) cross-section is enveloped by a shell portion 13 having a circular cross-section. Although not specifically shown, it is of course equally feasible that at least some of the layers 11 are built up by a core portion 15 having a polygonal cross-section enveloped by a shell portion 13 having the same polygonal cross-sectional shape. Such identically shaped polygonal cross sections may be aligned with each other or may be rotated relative to each other as schematically depicted in FIG. 12 in which a cross-section of a layer 11 of the optical component 10 comprises a core portion 15 having a polygonal cross-section enveloped by a shell portion 13 having an identically shaped polygonal cross-section, in which the polygonal cross sections are rotated relative to each other in order to tune the optical effect created with the optical component 10.

Figure 13:
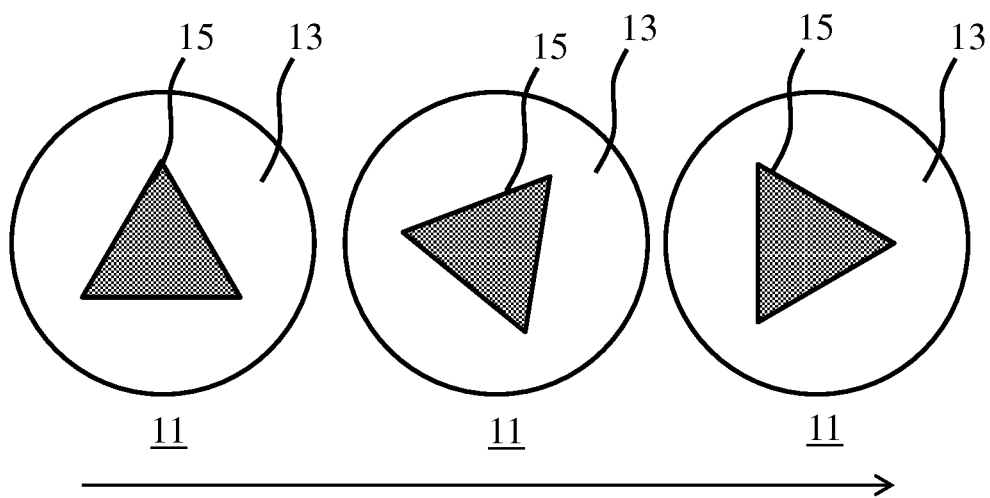
FIGS. 13 and 14 schematically depict cross-sectional views of a layer of an optical component according to further example embodiments.

In the above embodiments, it has been assumed that the orientation of the core portion 15 relative to the shell portion 13 remains constant throughout a layer 11, such that an observer looking at different regions of such a layer 11 is presented with the same optical effect across the layer. However, it should be understood that embodiments of the present invention are not limited thereto. FIG. 13 schematically depicts an alternative embodiment in which a layer 11 of the optical component 10 includes a core portion 15 having an orientation relative to its enveloping shell portion 13 that changes throughout the layer 11 in order to create locally different optical effects in the layer 11 such that when an observer looks at different regions of the layer 11, he or she is provided with different optical effects such that the optical component does not only provide inter-layer optical effects but also provides intra-layer optical effects.

FIG. 13 schematically depicts different cross-sectional views of the layer 11 along the layer 11 as indicated by the arrow, wherein the polygonal cross-section of the core portion 15 rotates or spirals within the enveloping shell portion 13 in order to create such a locally dependent optical effects. In this embodiment, the core portion 15 remains centred within the shell portion 13 of the layer 11 and is rotated around its central axis in order to obtain this locally dependent optical effect within the layer 11.

Figure 14:
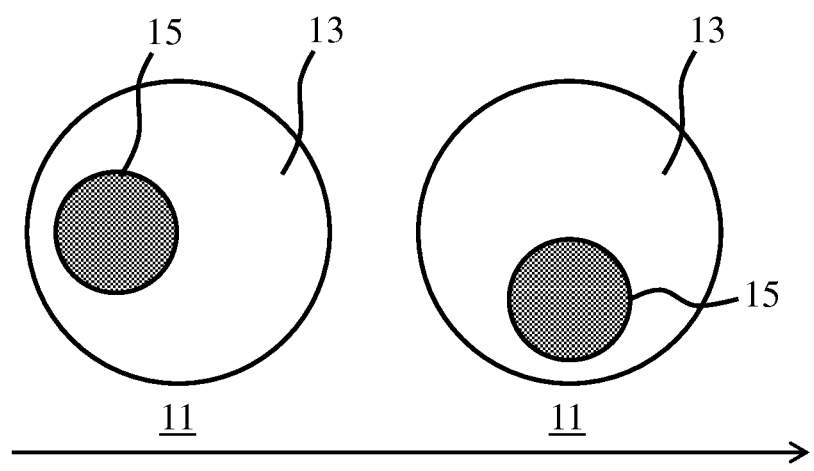

In an alternative embodiment schematically depicted in FIG. 14, such locally dependent optical effects in a layer 11 are achieved by moving or rotating the location of the core portion 15 within the shell portion 13 along the layer 11 as schematically depicted by different cross-sectional views of the layer 11 along its length as indicated by the arrow. In this embodiment, the centre of the core portion 15 is displaced relative to the centre of the shell portion 13. For the avoidance of doubt, it is noted that the centre of the core portion 15 may be displaced relative to the centre of the shell portion 13 in any embodiment of the optical component 10 of the present invention, such as the embodiments in which the position of the core portion 15 relative to the shell portion 13 remains constant throughout a layer 11.

At this point, it is noted that embodiments of the present invention are not necessarily limited to the creation of an optical effect with the optical component 10. For example, it is equally feasible to choose the first material of the core portions 15 and the second material of the shell portions 13 to influence the surface appearance of the optical component 10. For example, the optical component 10 may be given a glossy appearance and/or have angular reflectivity when using a highly transparent second material for the shell portions 13. Alternatively, the optical component may be given a matt appearance by choosing a more translucent material for the second material used to form the shell portions 13. Of course, the appearance of the optical component 10 may be tuned in this manner whilst combining it with the creation of angularly dependent optical effects as explained above, e.g. by tuning the first materials of the core portions 15.

The layers 11 including the shell portions 13 and the core portions 15 may be manufactured and assembled in any suitable manner. The optical component 10 is manufactured using a 3-D printing technique known as fused deposition modeling (FDM) printing. FDM printers use a thermoplastic filament, which is heated to its melting point and then extruded, layer by layer, to create a three dimensional object. FDM printers are relatively fast, low cost and can be used for printing complicated 3D objects. Such printers may be used for printing various shapes using various polymers, as is well-known per se.

To perform a 3D printing process, the printer may be controlled using a print command file generated by computer aided design (CAD) software specifying the 3-D shape of the optical component 10, and this controls how the filament is processed.

Figure 15:
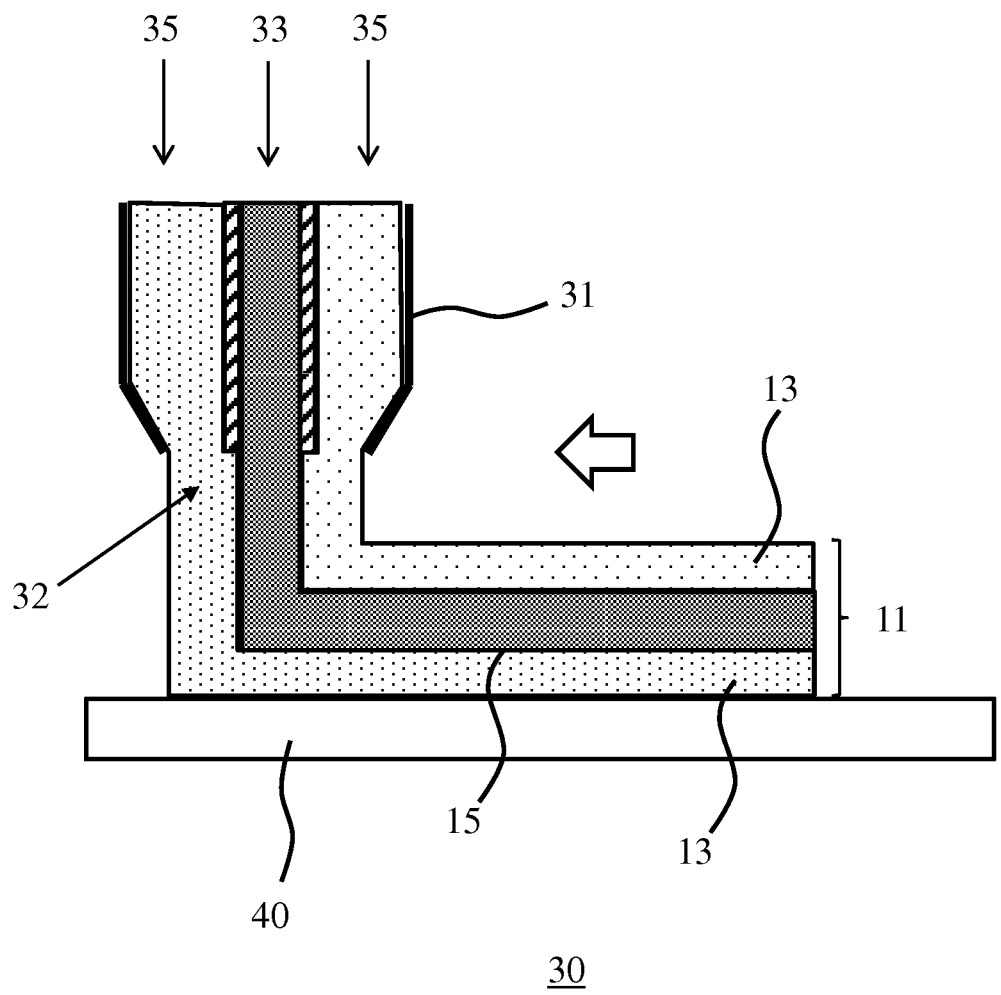
FIG. 15 schematically depicts a 3-D printer setup for printing an optical component according to example embodiments.

FIG. 15 is used to explain the operation of a fused deposition modeling printer 30. A filament 33 of the first material and a filament 35 of the second material is passed between a pair of driver wheels (not shown) to a printer head 31 having an output nozzle 32, a cross section of which is shown in FIG. 15. The nozzle 32 is configured to have extrusion holes that co-extrude (melt) the filaments 33 and 35 in the nozzle 32 such that the second filament 35 envelopes the first filament 33. Alternatively, the nozzle 32 may have a single extrusion hole through which a prefabricated core-shell filament is fed and molten. A layer 11 of the molten core and shell materials is deposited onto a print platform 40 while in a high viscosity liquid state, which then cools and becomes solid upon cooling. In this manner, a 3D structure may be built up as a sequence of layer patterns, e.g. the layers 11 including the core portion 15 and enveloped by the shell portion 13 to form the optical component 10, in which the optical component 10 may be manufactured in a bottom-up manner owing to the shape of the optical component 10 although it should be understood that this is by way of non-limiting example only as it is for example equally feasible to manufacture the optical component 10 in a top-down manner for most 3-D shapes of the optical component 10. The specific setup of the FDM printer 100 is not particularly limited as will be readily understood by the skilled person.

During printing, a support on which the optical component 10 is formed may be rotated in order to form the optical component 10 or alternatively the extruder nozzle 32 may be rotated during the 3-D printing of a layer 11 of the optical component 10 to form the 3-D shape of the optical component 10.

Any suitable material may be used for forming the respective (transmissive) shell portions 13 and the core portions 15. For example, these may be materials suitable for use in a 3-D printing process, e.g. polymers that may be extruded in an FDM printing process.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing at least one filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), styrene acrylonitryl (SAN), Acrylic (polymethylacrylate, Perspex, polymethylmethacrylate, Polyacrylonitry PMMA), copolymers of (metha)acrylates Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), thermoplastic elastomer, etc. Optionally, the 3D printable material comprises a 3D printable material selected from the group consisting of a polysulfone.

Highly transmissive polymers can be selected from Polyacrylics such as Polymethylmethacrylate (PMMA), Polycarbonate (PC) aromatic polyesters such as polyethyleneteleptthalate (PET), non aromatic polyyesters and copolymers thereof. Polystyrene, Styrene acrylonitryl, styrene methacrylate (SMA). For the core portions 15 but also the shell portions optical properties can be be tuned/altered by the addition of further materials such as colourants, particles with a different refractive index and also inorganic materials such as $TiO_x$. For example, in case of a coloured core portion 15, a colourant such as a dye or a pigment may be added to a polymer, in case of a diffusive core portion 15, scattering particles may be added to a polymer, in case of a reflective core portion 15, a reflective coating such as a metal coating may be printed on a surface of the core portion 15, in case of an emissive core portion 15, a luminescent compound may be added to the polymer, and so on. It is emphasized that these examples are non-limiting examples only and that of the skilled person will have no difficulty using his common general knowledge to find alternative materials that may be used to manufacture, e.g. 3-D print, the respective shell portions 13 and the core portions 15.

At this point, it is further noted that in some embodiments or layers 11 of the optical component 10 may be made of the same material or combination of materials whereas in alternative embodiments different layers 11 of the optical component 10 may be made of different materials or combinations of materials. For example, as previously explained, different layers 11 may have different core portions 15 and/or may have different shell portions 13, such that the desired optical properties of the optical component 10 may be tuned by selecting such different materials for different layers 11.

The optical component 10 according to embodiments of the present invention may be used as part of a luminaire such as a ceiling pendant, a floor-mounted luminaire in which the optical component is positioned on top of a (vertical) pole, and so on. Such a luminaire may further comprise one or more light sources, e.g. point light sources such as LEDs or diffuse light sources such as incandescent, halogen or fluorescent light sources. In case of multiple light sources within the luminaire, the light sources may be individually controllable to further enhance the optical effect that can be achieved by guiding the light generated with the light sources through the optical component 10. The one or more light sources in the luminaire may be dimmable. In an embodiment, the optical component 10 may be used as a lampshade of the luminaire although it should be understood that embodiments of the optical component 10 are not limited to such use and may be used in any suitable manner. The one or more light sources may be hidden from view by the optical component 10 in normal use. The one or more light sources may be positioned within the inner volume 20 of the optical component 10 or outside the inner volume 20 of the optical component 10, for example if the desired optical effect is to be created within the inner volume 20. For example, a plurality of light sources may be arranged on a substrate or carrier in a pattern such that the optical component 10 may be positioned inside the pattern, and wherein the light sources are arranged to couple light into the optical component 10.

The printable material may be printed on a receiver item. Especially, the receiver item may be the print platform 40 or may be comprised by the print platform 40. The receiver item can also be heated during 3D printing. However, the receiver item may also be cooled during 3D printing.

In the above embodiments, the layers 11 comprise a single continuous core portion. However, it should be understood that other embodiments, in which at least some of the layers 11 comprise a plurality of spatially separated cores enveloped by the shell material are also intended to be covered by the present invention, as are embodiments in which at least some of the layers 11 comprise one or more discontinuous cores.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of manufacturing an optical component by means of fused deposition modeling using a 3-D printing apparatus,
    wherein the 3-D printing apparatus comprises,
    an extruder nozzle, and
    a filament feeder for feeding a preformed core-shell filament having a core of a first material and a shell of a second material through the extruder nozzle, or a plurality of filament feeders including a first filament feeder for feeding a first filament comprising the first material through the extruder nozzle and a second filament feeder for feeding a second filament comprising the second material through the extruder nozzle; and the method comprises the step of:

3-D printing a stack of layers with the 3-D printing apparatus by feeding the preformed core-shell filament or the first filament and the second filament through the extruder nozzle such that molten second material surrounds the molten first material to form the optical component, wherein at least some of the layers of the optical component comprise a core portion made of the first material and a shell portion enveloping the core portion made of the second material, the first material having a different light transmissivity to the second;

tuning optical properties of the optical component by providing predetermined dimensions of the core portion and shell portion layer.

2. The method of claim 1, wherein at least the first filament feeder has a polygonal cross-section, and wherein 3-D printing the stack of layers with the 3-D printing apparatus comprises rotating the first filament feeder relative to the second filament feeder during printing of a layer comprising a core portion made of the first material and a shell portion surrounding the core portion made of the second material.

3. The method of claim 1, wherein 3-D printing a stack of layers with the 3-D printing apparatus to form the optical component further comprises at least one of:

printing different layers in which the core portion has different diameters; and printing at least one layer made of the first material or the second material only.

4. The method of claim 1, wherein the light effect includes angularly dependent light effects caused by light rays, wherein a first light ray passes through the optical component through the shell portion and wherein a second light ray interacts with the core portion such that these light rays are perceived differently or selectively by an observer.

5. The method of claim 1, wherein the predetermined light effect includes angularly-dependent light effects caused by light rays along different trajectories interacting differently with the shell portion of a layer and the core portion of a layer.

6. The method of claim 1, wherein the predetermined dimensions include the shell portion has a cross-sectional shape different to the core portion.

7. The method of claim 1, wherein the predetermined dimensions include the core portion and the shell portion each have polygonal cross-sections, wherein the polygonal cross-section of the core portion is rotated relative to the polygonal cross-section of the shell portion in at least a part of each layer.

8. The method of claim 1, wherein the predetermined dimensions include the orientation of the core portion relative to shell portion changes throughout each layer.

9. The method of claim 1, wherein the predetermined dimensions include at least one of the core portions in a layer in the stack of layers has different dimensions than at least one core portion of another layer of the stack of layers.

10. The method of claim 1, wherein tuning optical properties of the optical component further includes providing a predetermined the first material of the core portions and the second material of the shell portions to provide a predetermined surface appearance of the optical component, wherein the surface appearance includes a glossy appearance and/or have angular reflectivity when using a transparent second material for the shell portions or a matt appearance using a translucent material for the second material to form the shell portions.

11. A method of manufacturing an optical component by means of fused deposition modeling using a 3-D printing apparatus, wherein the 3-D printing apparatus comprises, an extruder nozzle, and a filament feeder for feeding a preformed core-shell filament having a core of a first material and a shell of a second material through the extruder nozzle, or a plurality of filament feeders including a first filament feeder for feeding a first filament comprising the first material through the extruder nozzle and a second filament feeder for feeding a second filament comprising the second material through the extruder nozzle; and the method comprises the step of:

3-D printing a stack of layers with the 3-D printing apparatus by feeding the preformed core-shell filament or the first filament and the second filament through the extruder nozzle such that molten second material surrounds the molten first material to form the optical component, wherein at least some of the layers of the optical component comprise a core portion made of the first material and a shell portion enveloping the core portion made of the second material, the first material having a different light transmissivity to the second material;

tuning optical properties of the optical component by controlling a shape the core portion, and wherein the enveloping shell portion of the layers is substantially transparent.

* * * * *